US005543800A

United States Patent [19]
Mills et al.

[11] Patent Number: 5,543,800
[45] Date of Patent: Aug. 6, 1996

[54] RADAR DECODER

[75] Inventors: George T. Mills; Albert T. Gabaldon, Jr., both of Ridgecrest, Calif.

[73] Assignee: The United States of America as represented by the Secretary of the Navy, Washington, D.C.

[21] Appl. No.: 552,455

[22] Filed: Nov. 6, 1995

[51] Int. Cl.⁶ .............................. G01S 7/04; G01S 7/295
[52] U.S. Cl. .......................... 342/197; 341/143; 342/176; 342/182
[58] Field of Search ..................................... 342/197, 176, 342/179, 182, 183, 185, 60; 341/143

[56] References Cited

U.S. PATENT DOCUMENTS

| | | | |
|---|---|---|---|
| 4,001,811 | 1/1977 | McIntosh | 341/68 |
| 4,066,964 | 1/1978 | Costanza et al. | 375/260 |
| 4,983,972 | 1/1991 | Mills | 341/143 |
| 5,063,575 | 11/1991 | Annamalai | 375/357 |
| 5,398,241 | 3/1995 | Witchey | 370/84 |

Primary Examiner—John B. Sotomayor
Attorney, Agent, or Firm—David S. Kalmbaugh; Melvin J. Sliwka; John L. Forrest

[57] ABSTRACT

A radar decoder circuit for converting NRZL Data to radar video data which is supplied to a radar video display screen. The radar video circuit includes an Erasable Programmable Logic Device which decodes incoming NRZL data to identify a frame sync having twenty four data bits. When the frame sync is identified the location of sixteen bits of synchro data is also determined. The synchro data is then latched into a latch within the Erasable Programmable Logic Device for processing by a Digital-to-Synchro Converter. Control signals for effecting a transfer of the synchro data to the Digital-to-Synchro Converter are provided by enable and latch signal generating circuit within the Erasable Programmable Logic Device. The Digital-to-Synchro Converter converts the digital synchro data to analog synchro signals which are supplied to the radar video display allowing the display to indicate the direction the radar from which the NRZL data is received is pointing. The Erasable Programmable Logic Device also includes a marker generating circuit which generates a ten kilometer marker pulse signal and a fifty kilometer marker pulse signal for use by the radar video display as well as trigger pulse signal which is used as timing reference indicator by the radar video display.

20 Claims, 10 Drawing Sheets

RADAR DECODER

BACKGROUND OF THE INVENTION

1. Field of the Invention

The present invention relates generally to radar systems. More particularly, the present invention relates to a decoder circuit which receives Non-Return-To-Zero-Level (NRZL) Data and decodes the Non-Return-To-Zero-Level Data to provide radar video data which is then supplied to a radar video display screen for viewing by the user of the radar display screen.

2. Description of the Prior Art

The military often locates a ground based radar at a site which is remote from the receiving station where the data from the radar is processed and then observed on radar video display screen. The distance between the ground based radar and the receiving station may be several miles which often requires that the radar data be transmitted over public lands via, for example, fiber optic cables. Since data from the ground based radar generally includes classified information there is a need to protect the data during the transmission thereof over the fiber optic cables linking the ground based radar to the receiving station. This requires that the radar data, which is generally in an analog format, be digitized for compatibility with digital formatted encryption units, such as the KG194 encryption unit, currently being utilized by the United States Armed Forces.

The encrypted data is next transmitted via the fiber optic cable to the receiving station where it is un-encrypted by a second encryption unit and then provided in a digital format for processing and then display on a radar video display screen. However, the digitized radar data must be supplied in an analog format which is compatible with the radar video display screen.

It is therefore an object of the present invention to provide radar video data which is compatible with a radar video display screen allowing the user of the radar video display screen to observe data provided by a remote site radar.

It is another object of the present invention to generate the radar trigger pulse which initiates a new sweep of the radar video display screen.

It is yet another object of the present invention to provide range marker signals to the radar video display screen so that the radar video display screen will display range markers thereon.

Other objects, advantages and novel features of the present invention will become apparent to those skilled in the art after reviewing the following detailed description of the preferred embodiment in conjunction with all of the figures of the drawings.

SUMMARY OF THE INVENTION

The present invention overcomes some of the disadvantages of the prior art including those mentioned above in that it comprises a radar decoder circuit for converting Non-Return-To-Zero-Level (NRZL) Data to radar video data which is then supplied to a radar video display screen for viewing by the user of the radar display screen. The radar decoder circuit includes an Erasable Programmable Logic Device which decodes incoming digitized NRZL data to identify a frame sync word having twenty four data bits. When the frame sync word is identified the location of sixteen bits of synchro data following the twenty four bit frame sync is also determined. The synchro data is then latched into a latch within the Erasable Programmable Logic Device for processing by a Digital-to-Synchro Converter. Control signals required to effect a transfer of the synchro data from the Erasable Programmable Logic Device to the Digital-to-Synchro Converter are provided by enable and latch signal generating circuit within the Erasable Programmable Logic Device. The Digital-to-Synchro Converter converts the digital synchro data to analog synchro signals which are supplied to the radar video display allowing the display to indicate the direction the radar from which the NRZL data is received is pointing.

The Erasable Programmable Logic Device also includes a marker generating circuit which generates a ten kilometer marker pulse signal and a fifty kilometer marker pulse signal for use by the radar video display as well as trigger pulse signal which is used as timing reference indicator by the radar video display.

The digitized NRZL data is supplied to a delta modulation circuit which converts the NRZL data stream into a reconstructed analog radar video signal for use by radar display screen.

DETAILED DESCRIPTION OF THE PREFERRED EMBODIMENT

Figure 1:
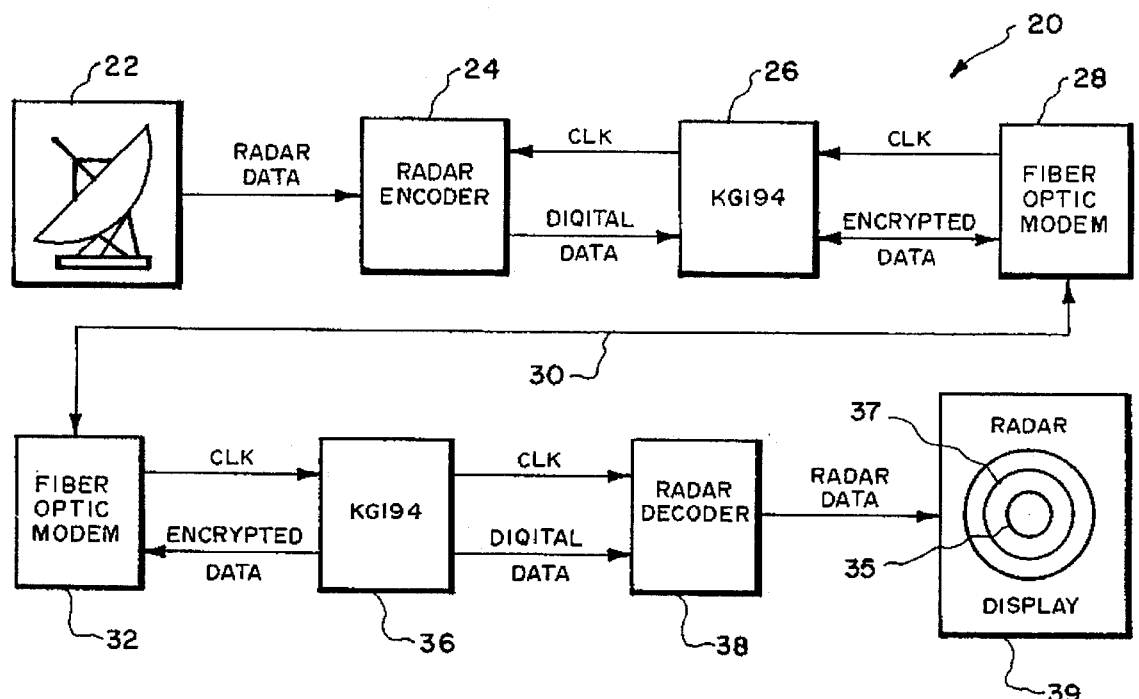
FIG. 1 is a schematic diagram of a communications system which uses a radar decoder to transmit radar video data from a radar to a radar display screen.
Figure 5:
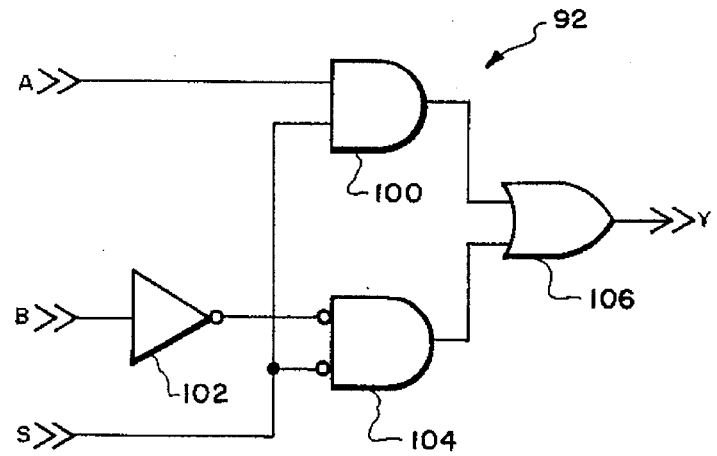
FIG. 5 is a detailed logic diagram of the multiplexer of FIG. 4b.
Figure 2A:
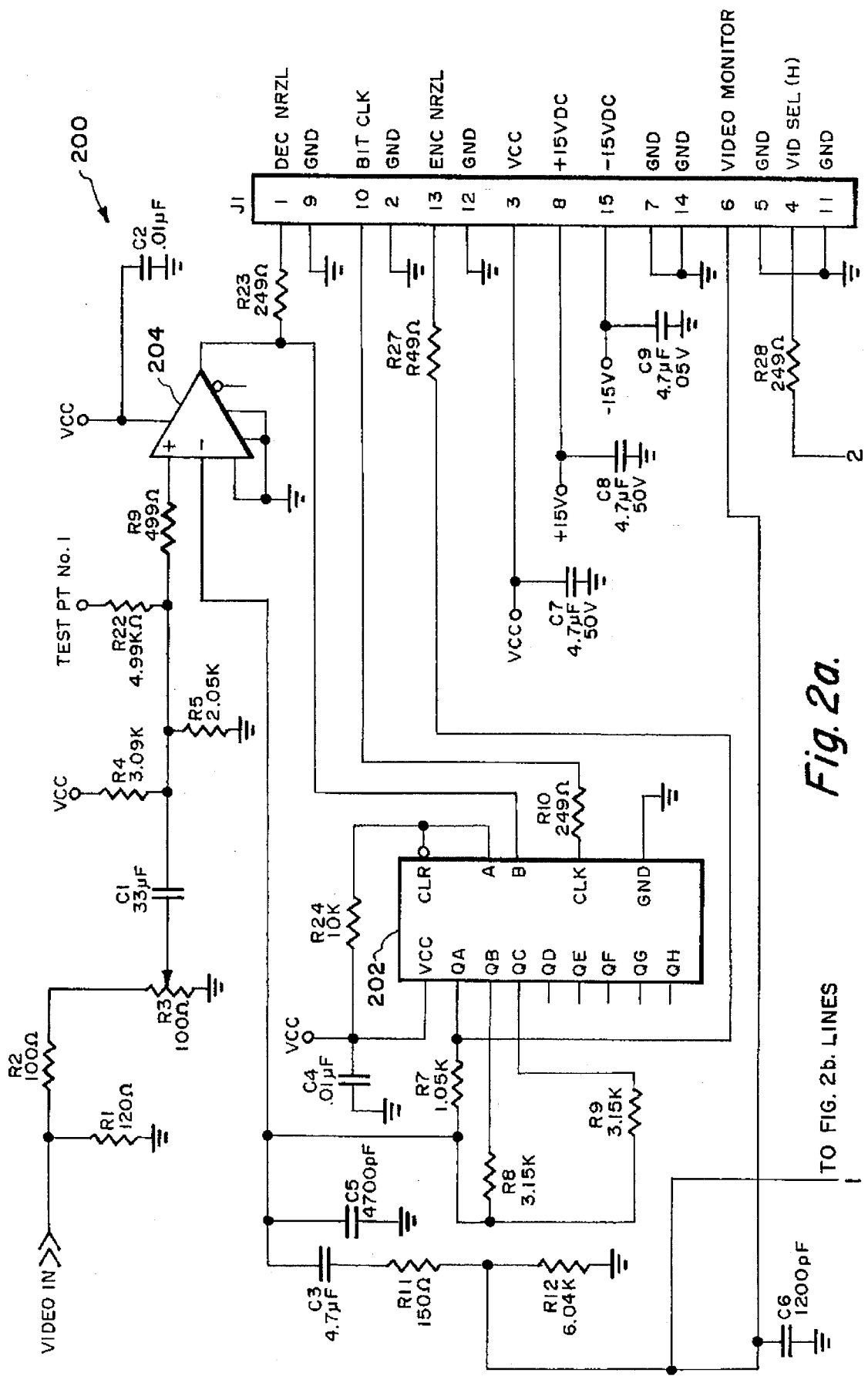
FIGS. 2a and 2b are a detailed electrical schematic diagram of the delta modulation circuit used in the preferred embodiment of the present invention
Figure 2B:
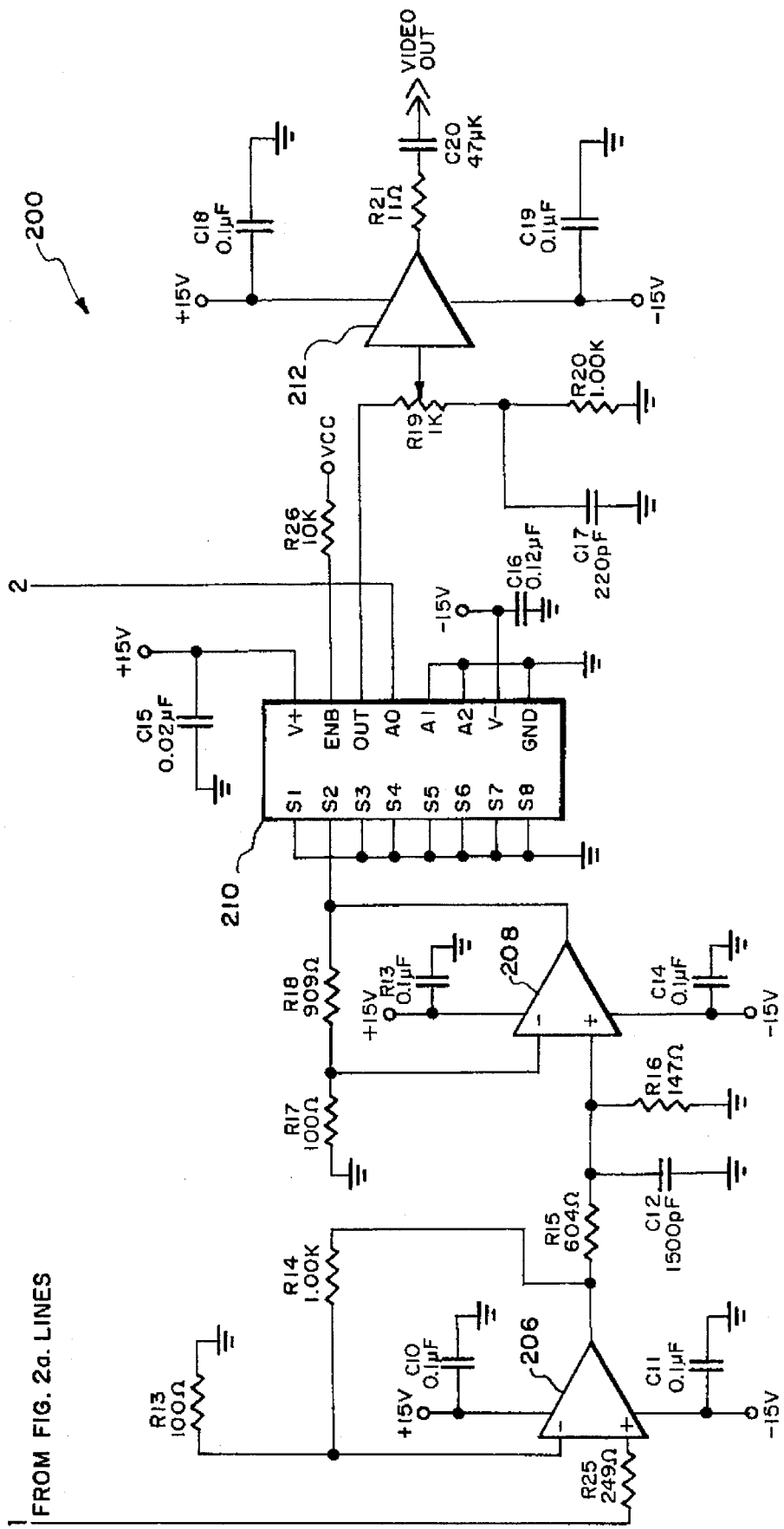

Referring first to FIG. 1, there is shown a communications system, designated generally by the reference numeral 20, which is used to transmit radar video data from a ground based radar 22 position at a remote cite to a receiving station which is located at a considerable distance from the radar 22. The radar 22 supplies to a radar encoder 24 radar video data which includes a trigger pulse, azimuth synchro signals and analog radar video data. Encoder 24 utilizes the trigger pulse to generate a frame sync word, digitizes the azimuth synchro signals at the time of occurrence of the sync pulse and then digitizes the analog radar video data. The digitized radar data is then combined by encoder 24 to a serial bit stream.

Encoder 24 digitizes the analog radar video data using Delta Modulation. Delta modulation is a well known modulation technique which uses one bit pulse-code modulation for digitizing an analog signal. In delta modulation, the knowledge of past information is used to simplify the coding technique and the resulting signal format. In delta modulation each bit represents the desired instantaneous slope of a signal which is the integrated encoded signal and corresponds to the input analog signal. Typically, a one of the delta modulation encoded signal represents a positive slop and a zero of the encoded signal represents a negative slop.

The digitized radar data is next supplied to a KG194 encryption unit 26 which is a standard military encoder used for encryption of digital data to be transmitted from a first location to a second location which is a considerable distance from the first location. The encrypted data is supplied to a fiber optic modem 28 which transmits via a pair of fiber optic lines 30 to a fiber optic modem 32 located at the receiving station. The encrypted data is next supplied to a second KG194 encryption unit 36 which un-encrypts the digitized radar data prior to its being supplied to a radar decoder 38. Radar decoder 38 which constitutes the present invention, replicates the radar data provided by radar 22 prior to supplying the radar data to a radar display screen 39. Radar video display screen 39 which is located at the receiving station provides a visual sweep of the objects detected by the radar 22 for the user of system 20.

Figure 3A:
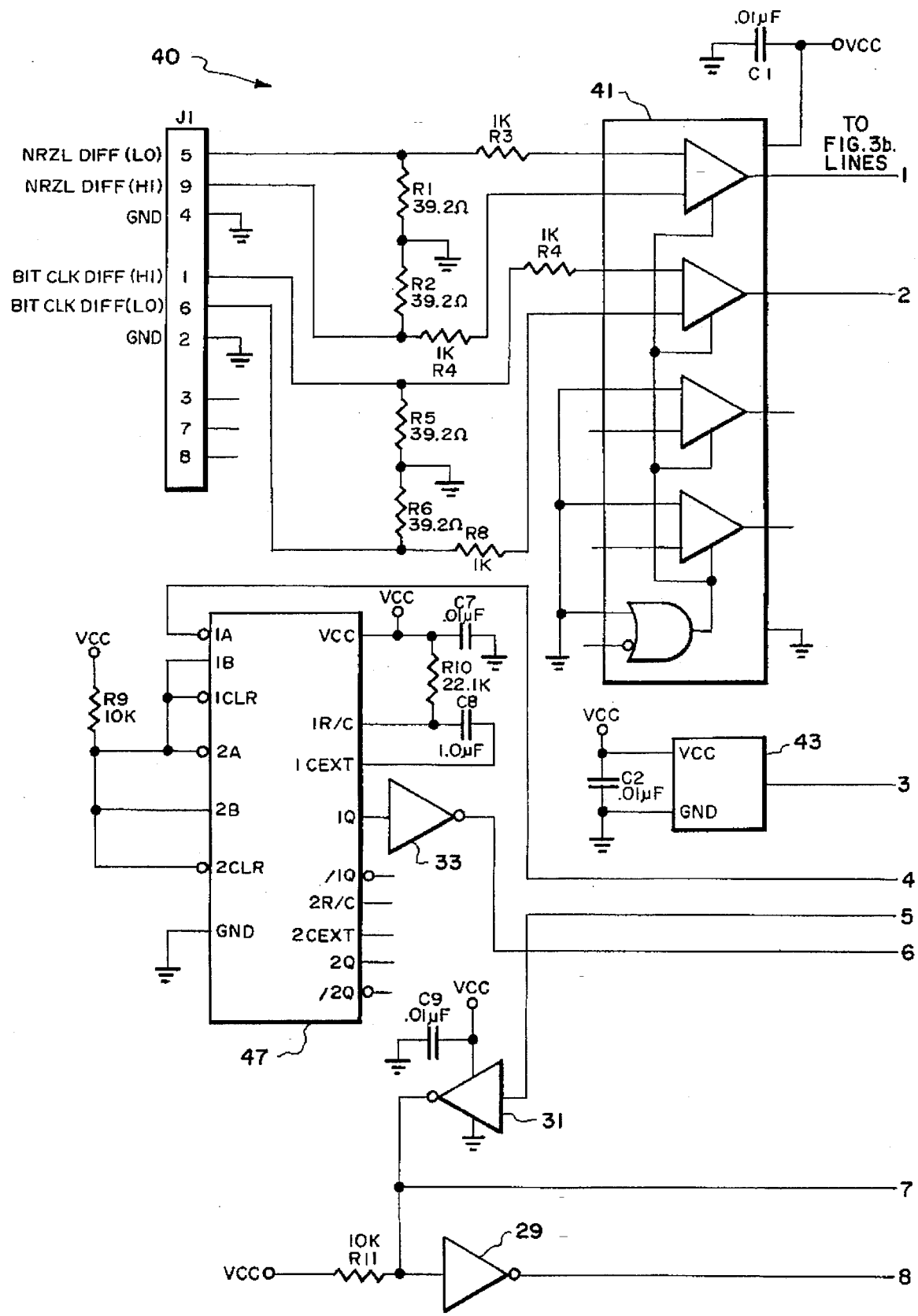
FIGS. 3a and 3b are a detailed electrical schematic diagram of the frame sync decoder within the radar decoder of FIG. 1.
Figure 3B:
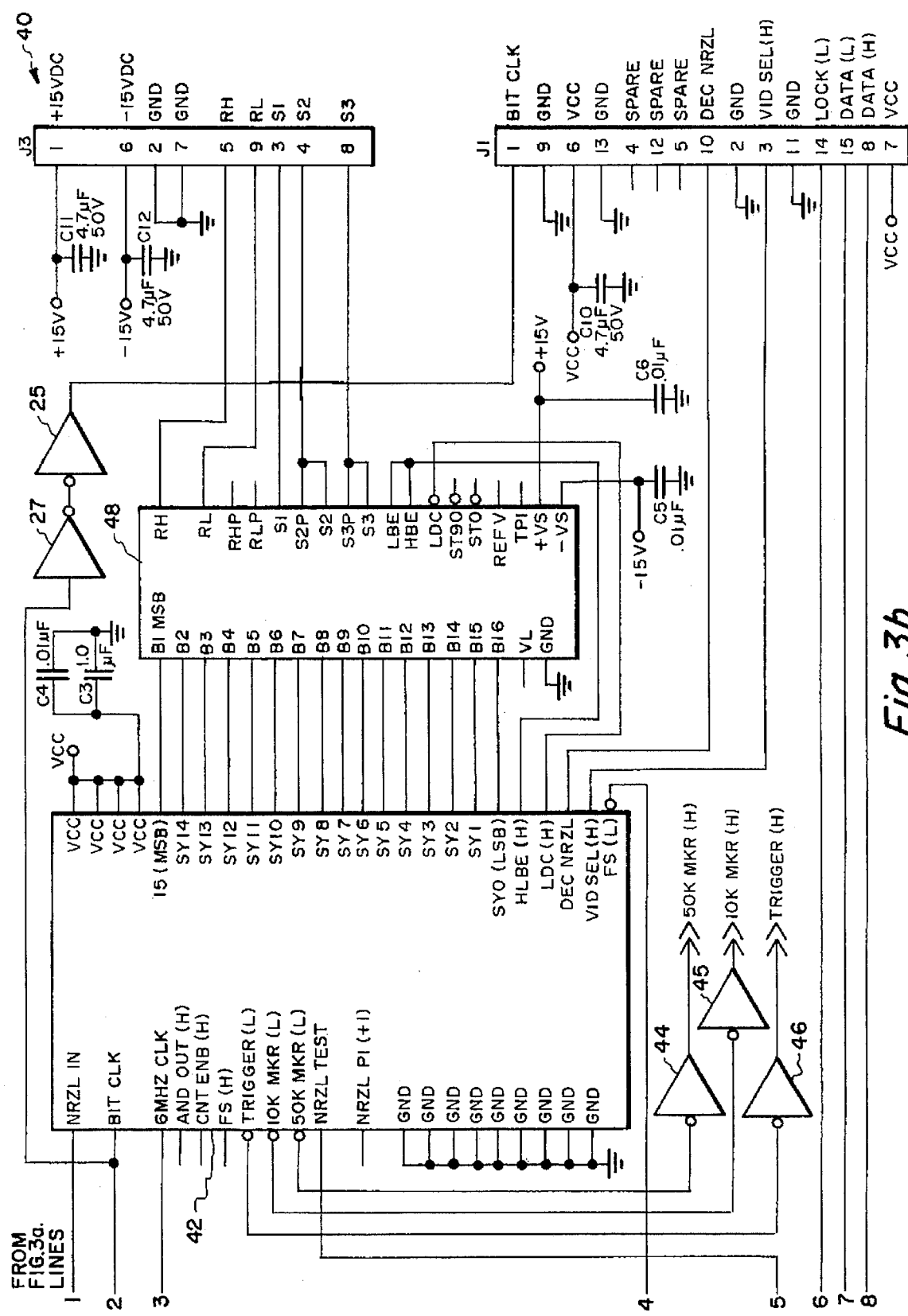
Figure 4A:
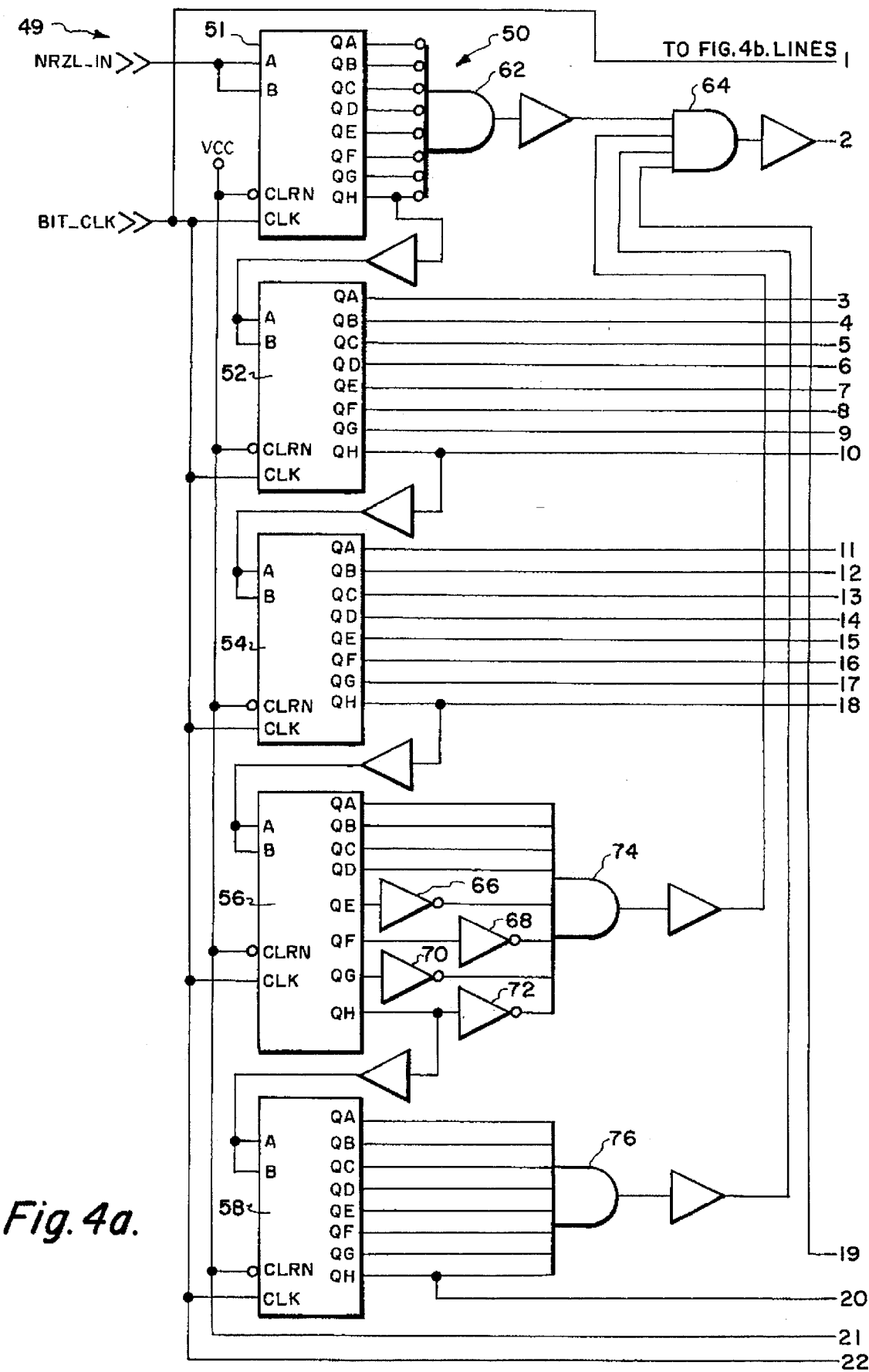
FIGS. 4a and 4b are a detailed logic diagram of the frame sync detector within the erasable programmable logic device of FIG. 3b.
Figure 4B:
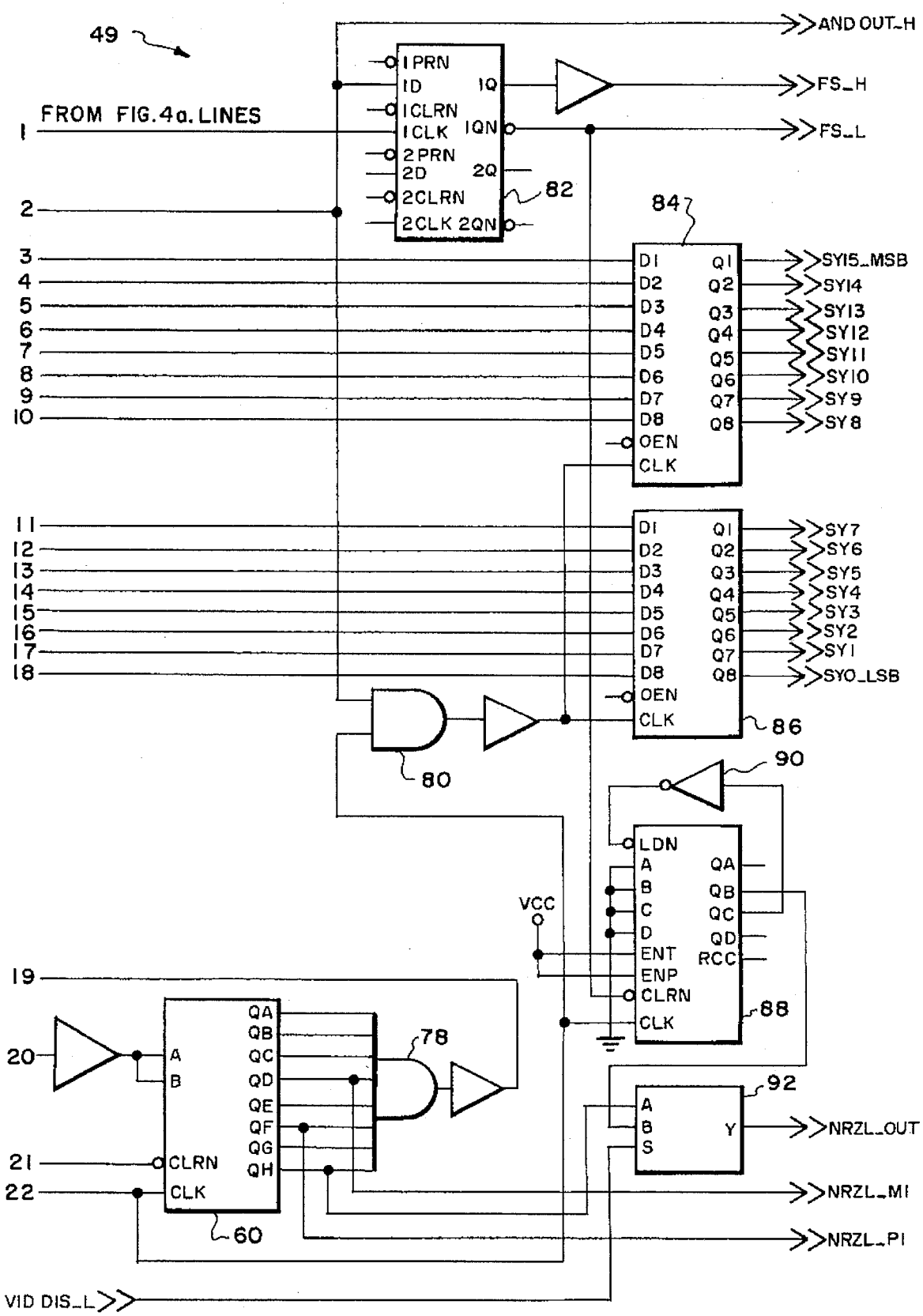
Figure 6:
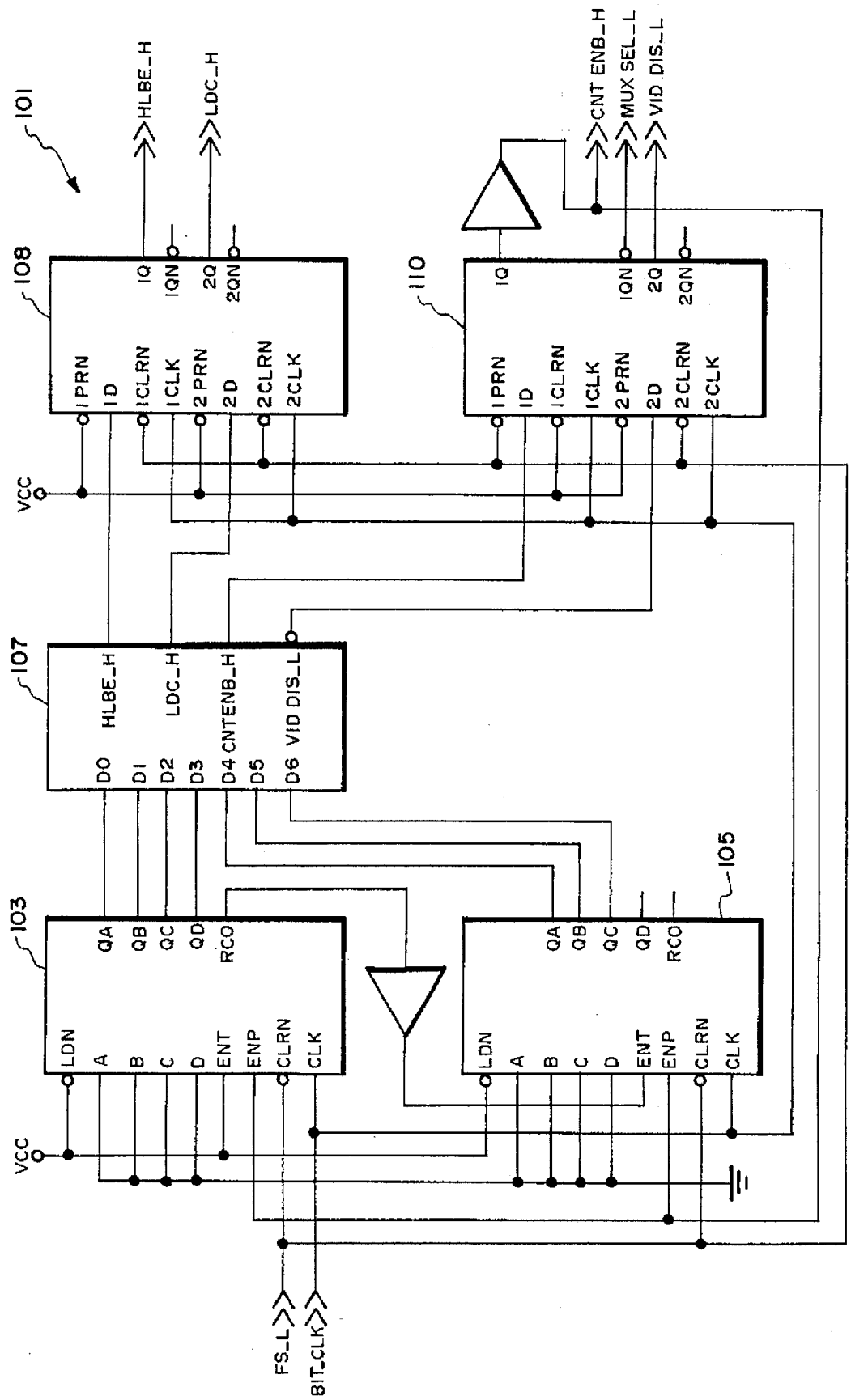
FIG. 6 is a detailed logic diagram of the enable and latch signal generating circuit within the erasable programmable logic device of FIG. 3b.
Figure 7A:
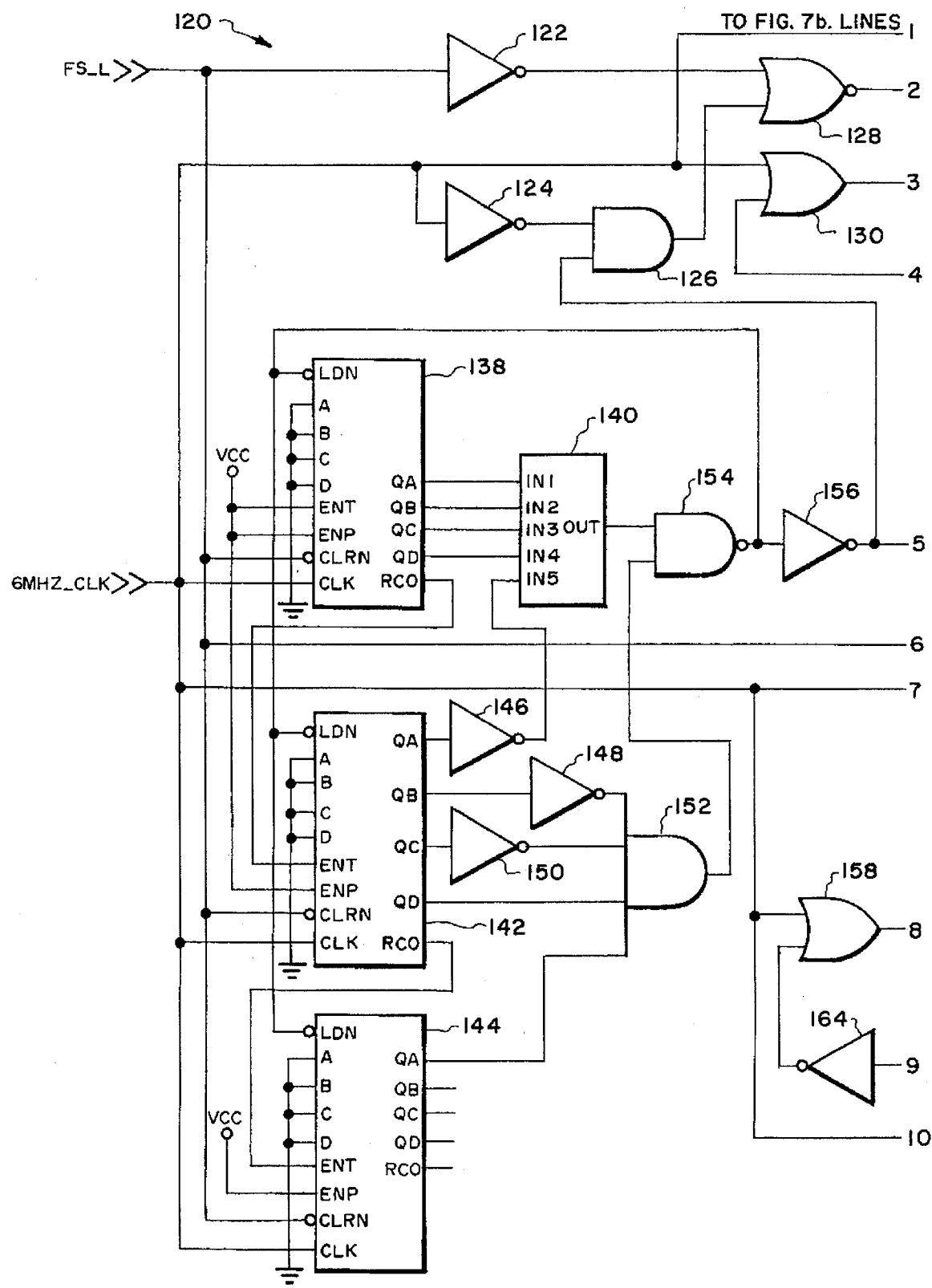
FIGS. 7a and 7b are a detailed logic diagram of the marker generating circuit within the erasable programmable logic device of FIG. 3b.
Figure 7B:
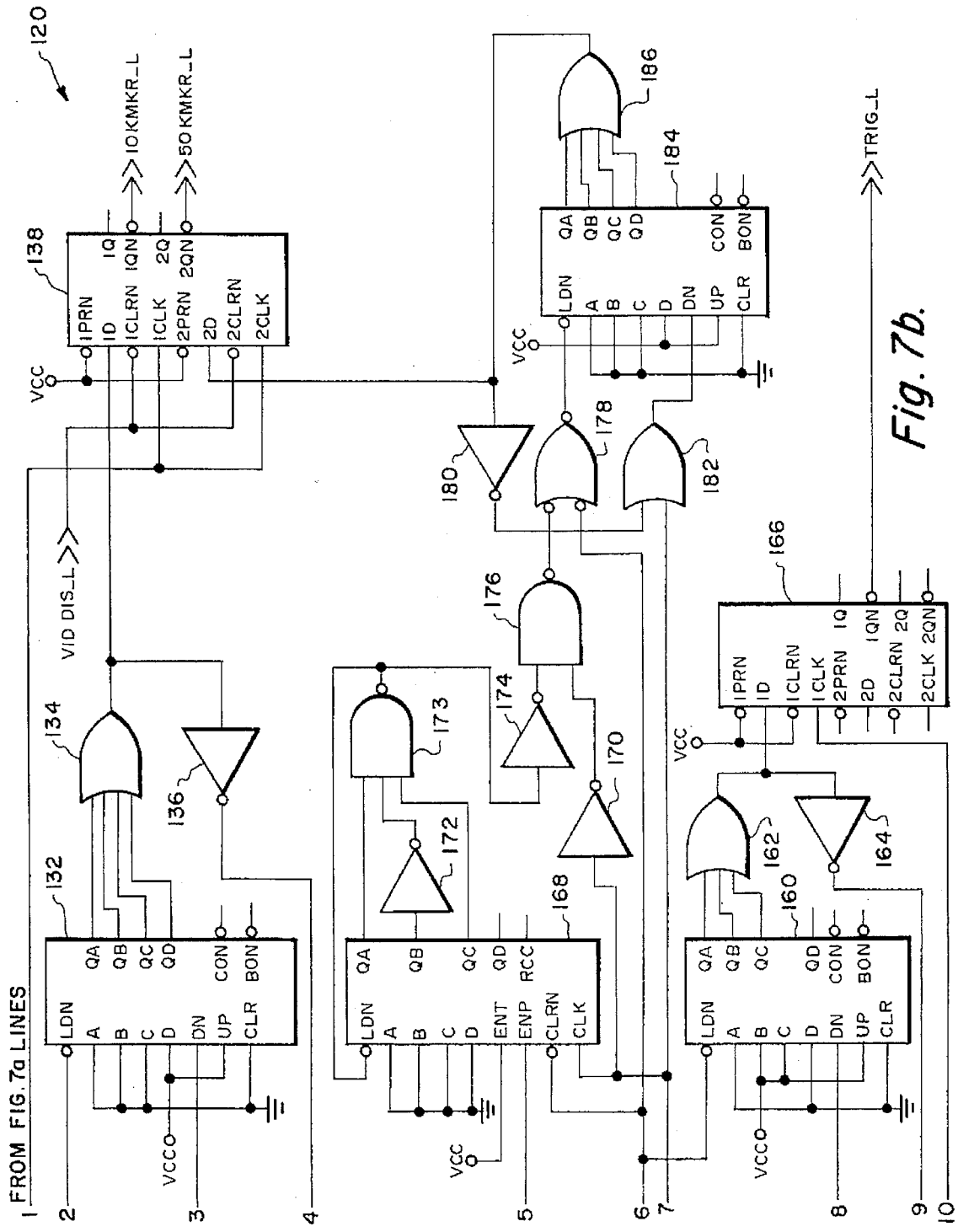

Referring now to FIGS. 1, 3a and 3b, there is shown the frame sync decoder circuit 40 of radar decoder 38 which includes a differential line receiver 41 for receiving serial differential Non-Return-To-Zero-Level (NRZL) Data from encryption unit 36. Differential line receiver converts the differential NRZL data to Non-Return-To-Zero-Level (NRZL) Data which may then be processed by Erasable Programmable Logic Device 42. Frame sync decoder circuit 40 of radar decoder 38 also receives a 12.624 megahertz clock signal from encryption unit 36 via differential line receiver 41. This 12.624 megahertz clock signal is in synchronous with the 12.624 megahertz clock signal supplied by encryption unit 26 to radar encoder 24. It should be noted that the 12.624 megahertz clock signal from encryption unit 36 is a differential signal which is supplied to differential line receiver 41 for processing to a digital format.

A six megahertz clock signal generated by a clock signal generator 43 is provided to the 6 MHz Clk input of Erasable Programmable Logic Device 42.

At this time it should be noted that the differential line receiver used in the preferred embodiment of the present invention is a Model DS26LS32C Quad Differential Line Receivers commercially available National Semiconductor Corporation of San Jose, Calif.

The Erasable Programmable Logic Device 42 used in the preferred embodiment of the present invention is a Model EPM5128-2 Erasable Programmable Logic Device commercially available from Altera Corporation of San Jose, Calif. Erasable Programmable Logic Device 42 uses a program called "ALTERA MAX+PLUSII" with the design being accomplished by the electrical schematics illustrated in FIGS. 4a, 4b, 5, 6, 7a and 7b.

Referring now to FIGS. 1, 3a, 3b 4a and 4b the NRZL serial data stream provided by encryption unit 36 is supplied to the NRZL_ in input of Erasable Programmable Logic Device 42 and includes forty eight bits having the following hexadecimal value: FF FF 0F and SS SS 00 (Hexadecimal). The twenty four bits FF FF 0F comprises the frame sync, the sixteen bits SS SS are synchro data provided by the radar 22 to indicate the direction radar 22 is pointing over a range from zero degrees to three hundred sixty degrees. The eight bits 00 (Hexadecimal) are included in the first forty eight bits of digital data to prevent the synchro data from being interpreted as the twenty four bits FF FF 0F (frame sync) whenever the synchro data bits SS SS are logic ones.

The forty eight bits including the frame sync are supplied to a forty eight bit shift register 50 within the frame sync detector 49 of Erasable Programmable Logic Device 42. Shift Register 49 comprises six eight-bit parallel out serial shift registers 51, 52, 54, 56, 58 and 60.

It should be noted that the first video data bit will be the forty ninth bit provided to shift register 50. The following illustrates the serial digitized data stream supplied to shift register 50 (hexadecimal) "FF FF 0F SS SS 00 Vd Vd Vd Vd . . . ". where Vd represents eight bits of radar video data.

It should also be noted that the Altera Model EPM5128-2 Erasable Programmable Logic Device includes a logic function (registers 51, 52, 54, 56, 58 and 60) which is equivalent to SN74164 eight-bit parallel out serial shift register commercially available from several sources including Texas Instruments of Dallas, Tex.

The 12.624 megahertz clock signal is supplied to the CLK (clock) inputs of eight-bit parallel out serial shift registers 51, 52, 54, 56, 58 and 60. This signal respectively clocks the first FF hexadecimal word of the frame sync into shift register 60, the second FF hexadecimal word is clocked into shift register 58, the third 0F hexadecimal word is clocked into shift register 56, the fourth SS hexadecimal word is clocked into shift register 54, the fifth SS hexadecimal word is clocked into shift register 52 and the sixth 00 hexadecimal word is clocked into shift register 51.

The logic ones (first FF hexadecimal word of the frame sync word) is supplied from the QA-QH outputs of shift register 60 to the inputs of AND gates 78 which provides at its output a logic one. In a like manner, the logic ones (second FF hexadecimal word of the frame sync word) is supplied from the QA-QH outputs of shift register 58 to the inputs of AND gates 76 which provides at its output a logic one. The logic zeros (0F hexadecimal word of the frame sync word) occurring at the QE-QH outputs of shift registers 56 are supplied to inverters 66, 68, 70 and 72 which inverts the logic zeros to logic ones and then provides the logic ones to AND gate 74, while the logic ones occurring at the QA-QD outputs of shift register 56 are supplied directly to AND gate 74 resulting in a logic one at the output of AND gate 74. The logic zeros (00 hexadecimal word of the frame sync word) occurring at the QA-QH outputs of shift registers 51 are supplied to the inverting inputs of a buffered AND gate 62 which provides at its output a logic one.

The logic ones from AND gates 62, 74, 76 and 78 are next supplied to AND gate 64 which causes its output to transition from the logic zero state to the logic one state. The 12.624 megahertz clock signal, which is supplied to the 1CLK input of a dual D-Type Flip-Flop 82, clocks the signal occurring at the output of AND gate 64 to the 1Q output of dual D-Type Flip-Flop 82 resulting in a logic zero to one transition at the 1Q output of dual D-type Flip-Flop 82. The 12.624 megahertz clock signal also clocks the signal occurring at the output of AND gate 64 to the 1QN output of dual D-Type Flip-Flop 82 resulting in a logic one to zero transition at the 1QN output of dual D-type Flip-Flop 2. The logic zero frame sync pulse is supplied to a one shot multivibrator 47 which provides at its 1Q output a pulse. The pulse occurring at the 1Q output of multivibrator 47 is inverted by an inverter 33, supplied to connector J2, pin 14 and then to a light emitting diode (not shown).

It should be noted that the pulse provided by multivibrator 47 is set to have a time period in excess of the pulse repetition interval of the radar system utilizing system 20.

When the first bit after the frame sync word is clocked into shift register 51 the logic zero occurring at the QH output of shift register 58 will be supplied through shift register 56 to the QA output of shift register 58 resulting in a logic zero at the output of AND gate 76. This logic zero is supplied to AND gate 64 resulting in a logic one to zero transition at the output of AND gate 64. The 12.624 megahertz clock signal next clocks the signal occurring at the output of AND gate 64 to the 1Q output of dual D-Type Flip-Flop 82 resulting in a logic one to zero transition at the 1Q output of dual D-type Flip-Flop 82 and the generation of a frame sync high pulse. Simultaneously the 1QN output of dual D-type Flip-Flop 82 provides a frame sync low pulse.

The NRZL serial data stream provided by encryption unit 36 also includes two eight bit synchro data words (identified as SS and SS) which are clocked into shift registers 52 and 54. When the output of AND gate 64 transitions to the logic one state a logic is provided to the first input of AND gate 80 enabling AND gate 80. The first pulse of the 12.624 megahertz clock signal occurring after AND gate 80 is enabled will clock the two eight bit synchro data words into a pair of eight bit latches 84 and 86.

At this time it should be noted that the Altera Model EPM5128-2 Erasable Programmable Logic Device includes a logic function (latches 84 and 86) which is equivalent to the SN74LS374 Eight-Bit D-Type Transparent Latch commercially available from several sources including Texas Instruments of Dallas, Tex.

Frame sync detector 49 also includes a four bit counter 88 which generates the bit pattern "001100011 . . . " after counter is cleared by a frame sync low pulse from the 1QN output of dual D-Type Flip-Flop 82. When the QC output of counter 88 transitions to a logic one on a binary count of four (1,0,0), inverter 90 will supply a logic zero to the LDN input of counter 88. This results in a logic zeros being loaded into counter 68 through its A, B, C and D inputs and the initial count of counter 88 being 0,0,0,0.

At this time it should be noted that the Altera Model EPM5128-2 Erasable Programmable Logic Device includes a logic function (counter 88) which is equivalent to the SN74161 Synchronous 4-Bit Counter commercially available from several sources including Texas Instruments of Dallas, Tex.

Frame sync detector 49 includes a multiplexer 92 (illustrated in detail in FIG. 5) which allows the bit pattern "001100011 . . . " to pass through multiplexer 92 or the NRZL data bits to pass through multiplexer 92. When a logic one is supplied to the S input (select) of multiplexer 92, AND gate 100 is enabled allowing the NRZL data bits to pass through AND gate 100 and or OR gate 106 to the output of multiplexer 92. When a logic zero is supplied to the S input of the first inverting input of AND gate 104 inverts this logic zero to a logic one enabling AND gate 104 which allows the bit pattern "001100011 . . . " to pass through inverter 102, AND gate 104 and OR gate 106 to the output of multiplexer 92.

The bit pattern "001100011 . . . " is generated to prevent delta modulation circuit 200 from saturating because of a stream of logic ones being provided to delta modulation circuit 200. If a stream of logic ones were provided to circuit 200, a stream of logic ones would result in an integration by delta modulation circuit 200 to five volts and then delta modulation circuit 200 would remain at five volts. During the time period the bit pattern "001100011 . . . " is being supplied to delta modulation circuit 200, the output signal from delta modulation circuit 200 is set at zero volts by multiplexer 210 to prevent a bright spot from appearing on radar display screen 39.

The NRZL data stream from multiplexer 92 is supplied to connector J2, Pin 10. The NRZL data stream is also provided to an inverter 31 which inverts each data bit of the NRZL data stream and then supplies the inverted data to connector J2, Pin 15. A second inverter 29 again inverts the NRZL data stream and supplies it to connector J2, Pin 8. Connector J2, Pins 8 and 15 are each connected to a light emitting diode (not illustrated) allows the user of frame sync decoder circuit 40 to determine whether NRZL data is being supplied to circuit 40.

Referring to FIGS. 3b, 4a and 4b and 6, there is shown an enable and latch signal generating circuit 101 which generates certain control signals utilized by circuit elements within Erasable Programmable Logic Device 42 and which includes a pair of synchronous four bit counters 102 and 104 which are configured to provide an eight bit counter. The 12.624 megahertz clock signal is supplied through the Bit_Clk input of circuit 100 to the CLK inputs of counters 102 and 104.

When the frame sync low pulse goes to the logic zero state, a logic zero is provided to the 1 PRN input of a dual D-Type Flip-Flop 110 and 2CLRN input of dual D-Type Flip-Flop 110. This sets the 1Q output of dual D-type Flip-Flop 110 to the logic one state, the 1QN output of Flip-Flop 110 to the logic zero state and the 2Q output of dual D-type Flip-Flop 110 to the logic zero state. This logic zero is also supplied to the 1CLRN and the 2CLRN inputs of Flip-Flop 108 setting the 1Q and 2Q outputs of dual D-type Flip-Flip 108 to the logic zero state. The frame sync low pulse also clears counters 103 and 105 resulting in logic zeros at the QA, QB, QC and QD outputs of counters 103 and 105.

The logic one at the 1Q output of dual D-Type Flip-Flop 110 is supplied to the ENP input of counters 103 and 105 enabling counters 103 and 105. After being enabled counters 103 and 105 provide a seven bit binary count to the D0–D6 inputs of a state machine 107.

As is best illustrated in the program listing of Appendix A which, responsive to this count, provides certain enable and latch signals at its outputs. Specifically, when the binary count is greater than four (0000100) and less than fourteen (0001110) the HLBE_H output of state machine 107 is at the logic one state. When the binary count is greater than seventeen (0010001) and less than twenty seven (0110011) than the LDC_H output of state machine 107 is at the logic one state. When the binary count is less than seventy seven (1001101) the Cnt_Enb_H output of state machine 107 is at the logic one state. When the binary count is less than fifty one (0011011) then the VidDis_L output of state machine 107 is at the logic zero state, otherwise the VidDis_L output of state machine 107 is at the logic one state.

The HLBE_H output of state machine 107 is connected to the 1D input of dual D-Type Flip-Flop 108 which results in the signal appearing at the HLBE_H output of state machine 107 being clocked through dual D-Type Flop-Flop 108 to its 1Q output by the 12.624 megahertz clock signal. In a like manner, the signal appearing at the LDC_H output of state machine 107 is clocked through dual D-Type Flop-Flop 108 to its 2Q output. The signal appearing at the CntEnb_H output of state machine 107 is clocked through dual D-Type Flop-Flop 110 to its 1Q output and the inversion of this signal appears at the 1QN output of dual D-Type Flop-Flop 110. The signal appearing at the VidDis_L output of state machine 107 is clocked through dual D-Type Flop-Flop 110 to its 2Q output.

At a count of seventy seven state machine 107 provides a logic zero at its CntEnb_H output which is clocked through dual D-Type Flip-Flop 110 to the ENP inputs of counters 103 and 105 disabling counters 103 and 105.

The VidDis_L output of enable and latch signal generating circuit 101 is connected to the select input of multiplexer 92 providing the logic signal to the select input of multiplexer 92 which determines whether the bit pattern "001100011 . . . " passes through multiplexer 92 or the NRZL data bits pass through multiplexer 92.

The logic one signal occurring at the HLBE_H output of enable and latch signal generating circuit 101 is supplied to the HBE and LBE inputs of a Digital-to-Synchro Converter 48. In a like manner, the logic one signal occurring at the LDC_H output of enable and latch signal generating circuit 101 is supplied to the LDC input of a Digital-to-Synchro Converter 48. These logic signals effect a transfer of the two eight bit synchro data words stored in eight bit latches 84 and 86 into Digital-to-Synchro Converter 48. The logic one signal supplied to HBE and LBE inputs of a Digital-to-Synchro Converter 48 is at this state for about 600 nanoseconds allowing sufficient time for the sixteen synchro data bits to stabilize at the B1–B16 inputs of Digital-to-Synchro Converter 48. Two hundred nanoseconds after the data is stable, the data, which is angular input information, is transferred to a holding register within Digital-to-Synchro Converter 48. This transfer is effected by the logic one pulse supplied to the LDC input of a Digital-to-Synchro Converter 48 which remains high for a time period of about 600 nanoseconds.

At this time it should be noted that the Digital-to-Synchro Converter 48 used in the preferred embodiment of the present invention is a Model HDSR 2006 Digital-to-Analog Synchro/Resolver Converter Microprocessor Compatible 16-Bit Hybrid manufactured by NATEL Engineering Company of Simi Valley, Calif.

Referring to FIGS. 1, 3*b*, 7*a* and 7*b*, there is shown a marker signal generating circuit 120 which generates the 10KMKR_L and 50KMKR_L logic signals for the radar display screen 39. The frame sync low pulse is supplied to the CLRN inputs of synchronous four bit counters 138, 142 and 144 clearing the QA, QB, QC and QD outputs of counters 138, 142 and 144 to the logic zero state.

The six megahertz clock signal from clock signal generator 43 is supplied through the 6MHz_Clk input of marker signal generating circuit 120 to the CLK inputs of counters 138, 142 and 144. When the binary count from counters 144, 142 and 138 is 1,1,0,0,0,1,1,1,1 (decimal equivalent 399) a logic one will occur at the output of AND gate 140 and a logic one will occur at the output of AND gate 152. These logic ones are next supplied to the first and second inputs of NAND gate 154 resulting in a logic one to zero transition at the output of NAND gate 154. The logic zero is then supplied to the LDN inputs of counters 138, 142 and 144 which results logic zeros being loaded into counters 138, 142 and 144 by the next clock pulse of the six megahertz clock signal. The outputs of AND gates 140 and 152 will each transition to the logic zero state resulting in a logic zero to one transition at the output of NAND gate 154. This, in turn, results in a positive going pulse at the output of inverter 156 having a frequency of 15 kilo-hertz and a pulse width of one clock cycle of the six megahertz clock. This positive going pulse from inverter 156 is supplied to the ENP input of a counter 168 enabling counter 168.

It should be noted that the output of inverter 156 will be at the logic zero state for a count of 399 before providing another positive going pulse. It should also be noted that the 15 kilo-hertz positive going pulse occurring at the output of inverter 156 is the timing signal for the ten kilometer range marker 35 on radar video display 39 (FIG. 1).

After counter 168 is enabled the next clock pulse of the six megahertz clock signal will increment counter 168 by a count of one resulting in a logic one at the QA output of counter 168. Each successive 15 kilo-hertz positive going pulse from inverter 156 will result in counter 168 being incremented by a count of one until the QA, QB, and QC outputs of counter 168 are respectively 1,0,1. Since the QB output of counter 168 is connected to an inverter 172, logic ones are supplied to each of the inputs of NAND gate 173 which, in turn, provides a logic one to zero transition its output. The logic zero from NAND gate 173 is then supplied to the LDN input of counter 168.

The first clock pulse of the 6 megahertz clock signal occurring after the LDN input of counter 168 is at the logic zero state will load logic zeros through the A, B and C inputs of counter 168 to its QA, QB and QC outputs. This results in a logic zero to one transition at the output of NAND gate 173. This, in turn, results in a positive going pulse at the output of inverter 174 having a frequency of 3 kilo-hertz.

It should be noted that the 3 kilo-hertz positive going pulse occurring at the output of inverter 176 is the timing signal for the fifty kilometer range marker 37 on radar video display 39 (FIG. 1).

The three kilo-hertz pulse signal from inverter 174 is supplied through NAND gate 178 to a buffered NOR gate 178 which provides at its output an inversion the three kilo-hertz pulse signal. The inverted three kilohertz pulse signal is next supplied to the LDN input of an up/down counter 184 loading a count of eight into counter 184. Up/down counter 184 is configured to provide the pulse width for the three kilo-hertz pulse signal.

In a like manner, a negative going fifteen kilohertz pulse signal is supplied from NOR gate 128 to the LDN input of up/down counter 132 loading a count of eight into counter 132. Up/down counter 132 is configured to provide the pulse width for the fifteen kilo-hertz pulse signal.

Each counter 132 and 184 is clocked by the six megahertz clock signal and counts down from eight. The pulse occurring at the output of OR gate 134 is an eight clock period wide pulse, that is the pulse width of this pulse is about 1.33 microseconds. In a like manner, the pulse occurring at the output of OR gate 186 has a pulse width of about 1.33 microseconds.

The fifteen kilo-hertz pulse signal is supplied to the 1D input of a dual D-Type Flip-Flop 138 and then clocked through dual D-Type Flip-Flop 138 by the six megahertz clock signal to its 1QN output resulting in a negative going pulse signal at the 1QN output of dual D-Type Flip-Flop 138. The three kilo-hertz pulse signal is supplied to the 2D input of a dual D-Type Flip-Flop 138 and then clocked through dual D-Type Flip-Flop 138 by the six megahertz clock signal to its 2QN output resulting in a negative going pulse signal at the 2QN output of dual D-Type Flip-Flop 138. Dual D-Type Flip-Flop 138 is cleared by the signal provided at the VidDis_L output of enable and latch signal generating circuit 101.

The inversion of the fifteen kilo-hertz pulse signal is next supplied to an inverter 44 which inverts the signal and then provides the fifteen kilo-hertz pulse signal to radar display screen 39 allowing display screen to generate the ten kilometer range marker 35. The inversion of the three kilo-hertz pulse signal is next supplied to an inverter 45 which inverts the signal and then provides the fifteen kilo-hertz pulse signal to radar display screen 39 allowing display screen to generate the ten kilometer range marker 37.

At this time it should be noted that the Altera Model EPM5128-2 Erasable Programmable Logic Device includes a logic function (counters 132, 166 and 184) which is equivalent to SN74193 synchronous 4-Bit Up/Down Counter commercially available from several sources including Texas Instruments of Dallas, Tex.

The frame sync low pulse from the 1QN output of dual D-type Flip-Flop 82 is supplied through the FS__L input of marker signal generating circuit 120 to the LDN input of up/down counter 160. This pulse loads a count of six into counter 160. Counter 160 then counts down from six to zero. From a count of six to a count of zero at least one of the QA, QB or QC outputs of counter 160 is at the logic one state resulting in a logic one at the output of OR gate 162 for a time period of about one microsecond. This, in turn, is the pulse width of the trigger pulse signal generated by marker signal generating circuit 120. The trigger pulse is next supplied to the 1D input of a dual D-Type Flip-Flop 166 and then clocked through dual D-Type Flip-Flop 166 by the six megahertz clock signal to its 1QN output resulting in a negative going pulse signal at the 1QN output of dual D-Type Flip-Flop 166. The inversion of the trigger pulse signal is next supplied to an inverter 46 which inverts the signal resulting in a one microsecond trigger pulse signal which is the reference signal for data transfer to the radar display screen 39.

Referring to FIGS. 1, 3a, 3b, 4a and 4b, the frame sync word includes sixteen synchro data bits which are latched into latches 84 and 86 by the first pulse of the 12.624 megahertz clock signal occurring after AND gate 80 is enabled. The synchro data is digitized data which functions as a pointing vector indicating the direction radar 22 is pointing. Synchro data has a range from zero degrees to three hundred sixty degrees. The logic one signals occurring at the HLBE__H and the LDC__H outputs of enable and latch signal generating circuit 101 effect the transfer of the two eight bit synchro data words stored in eight bit latches 84 and 86 to Digital-to-Synchro Converter 48. Digital-to-Synchro Converter 48 provides analog synchro signals (which are sin and cosine functions) at its S1, S2 and S3 outputs. The analog synchro signals from Digital-to-Synchro Converter 48 are next provided to radar display screen 39 which uses these signals to provide an angle position visual indicator of the angular position of radar 22 which is equivalent to a pointing vector indicating the direction radar 22 is pointing.

Referring now to FIGS. 1, 2, 3a, 3b, 4a and 4b the NRZL data stream from multiplexer 92 is supplied through the Dec NRZL output of Erasable Programmable Logic Device 42 through connector J2 Pin 10 to the B input of an eight bit parallel-out shift register 202. Shift register 202 is a component of a delta modulation circuit 200 which has the function of converting the NRZL data stream into a reconstructed radar video signal for use by radar display screen 39. The method used for reconstructing the radar video signal is continuously variable slope delta modulation. This method and its associated circuitry which includes shift register 202, comparator 204, resistor R7, R8 and R9, and capacitor C5 is described in U.S. Pat. No. 4,983,972. The disclosure of U.S. Pat. No. 4,983,972, which issued Jan. 8, 1995 to George T. Mills is incorporated by reference into the disclosure of the present invention.

The combination of shift register 202, resistor R7, R8 and R9, and capacitor C5 reconstruct the radar video signal in the manner described in U.S. Pat. No. 4,983,972.

The reconstructed radar video signal passes through a capacitor C3, which functions as a coupling capacitor to an RC filtering network consisting of resistors R11 and R12 and capacitor C6. This filter eliminates digital noise from the reconstructed radar video signal.

The reconstructed radar video signal is next supplied to a pair of amplifiers 206 and 208 which amplify the signal to provide an eight volt peak-to-peak signal.

The amplified radar video signal is supplied to the S2 input of an analog multiplexer 210. Analog multiplexer 210 also receives a Video Select signal generated by Erasable Programmable Logic Device 42.

During the time period the Video Select signal is a logic one radar video data is being supplied to multiplexer 210. A logic one at the A0 input of multiplexer 210 selects channel 2 of multiplexer 210 allowing radar video data supplied to the S2 input of multiplexer 210 to pass through multiplexer 210 to its output.

During the time period the Video Select signal is low frame sync data and synchro data are being supplied to the S2 input of multiplexer 210. A logic zero at the A0 input of multiplexer 210 selects channel 1 of multiplexer 210 allowing the zero volt signal at the S1 input of multiplexer 210 to pass through multiplexer 210 to its output and then to radar video display 39. This prevents the bit pattern generated by counter 88 from passing through multiplexer 210.

It should be noted that the Video Select signal is the signal provided at the 1QN output of dual D-Type Flip-Flop 110.

The analog multiplexer 210 used in the preferred embodiment of the present invention is a Model MAX310 CMOS RF/Video Multiplexer, commercially available from Maxim Integrated Circuit Products Ltd. of the United Kingdom.

The delta modulation circuit 200 also includes a variable circuit R19 which allows the reconstructed analog radar video signal to be adjusted through a range of four volts peak-to-peak to eight volts peak-to-peak. The adjusted radar video signal is next supplied to a current buffer 212. The output signal from current buffer is AC coupled and is the radar video signal supplied to radar display screen 39.

Obviously, many modifications and variations of the present invention are possible in light of the above teachings. It is, therefore, to be understood that the present invention may be practiced within the scope of the following claims other than as described herein.

Appendix A

MAX+plus II 5.3 File: ENABLES.TDF
Subdesign 'enables'
( D[6..0]                              : INPUT;
  HLBN__H,LDC__H,CntEnb__H,VidDis__L   : OUTPUT;)
BegIN
  IF ( (D[] > 4) AND (D[] < 14) ) THEN HLBE__H = Vcc;
    END IF;
  IF ( (D[] > 17) AND (D[] < 27) ) THEN LDC__H = Vcc;
    END IF;
  IF (D[] < 77) THEN CntEnb__H = Vcc; END IF;
  IF (D[] < 51) THEN VidDis__L = GND;
    ELSE VidDis__L = Vcc;
    END IF;
End;

What is claimed is:

1. A radar data decoder for decoding a serial differential data stream received from an encryption unit, said encryption unit generating a differential clock signal, said radar data decoder comprising:

differential line receiving means connected to said encryption unit for receiving said serial differential data stream and said differential clock signal from said encryption unit, said different line receiving means converting said serial differential data stream to a serial digital data stream and said differential into a digital clock signal;

frame sync detecting means connected to said differential line receiving means for receiving said serial digital data stream, said frame sync detecting means generating a frame sync pulse whenever said frame sync detecting means detects a frame sync word encoded in said serial digital data stream;

said frame sync detecting means decoding said serial digital data stream to provide digital synchro data encoded in said digital data stream whenever said frame sync detecting means detects a frame sync word encoded in said serial digital data stream;

latching means connected to said frame sync detecting means for receiving said digital synchro data encoded in said digital data steam, said latching means, responsive to said frame sync pulse, latching therein said digital synchro data;

counting means connected to said differential line receiving means for receiving said digital clock signal, said counting means, responsive to said digital clock signal, generating a random binary number pattern;

first multiplexing means connected to said counting means for receiving said random binary number pattern and said frame sync detecting means for receiving said serial digital data stream;

control signal generating means connected to said frame sync detecting means for receiving said frame sync pulse and said differential line receiver for receiving said digital clock signal, said control signal generating means, responsive to said frame sync pulse and said digital clock signal, generating at least four control signals;

said first multiplexing means being connected to said control signal generating means to receive a first of said four control signals, said first multiplexing means passing therethrough said random binary number pattern whenever said first of said four control signals is at one logic state and said multiplexing means passing therethrough digital radar video data encoded within said serial digital data stream whenever said first of said four control signals is at another logic state;

converting means connected to said latching means and said control signal generating means for receiving a second of said four control signals and a third of said four control signals from said control signal generating circuit, said second and third of said four control signals effecting a transfer of said digital synchro data from said latch circuit to digital to synchro converter, said digital to synchro converter converting said digital synchro to analog synchro signals;

modulation means connected to said first multiplexing means for receiving said random binary number pattern and said digital radar video data from said first multiplexing means, said modulating means converting said digital radar video data into a reconstructed analog radar video signal;

second multiplexing means connected to said modulation means and said control signal generating means for receiving a fourth of said four control signals, said second multiplexing means passing therethrough said reconstructed analog radar video signal whenever said fourth of said four control signals is at an active logic state; and marker signal generating means connected to said frame sync detecting means for receiving said frame sync pulse, said marker signal generating means, responsive to said frame sync pulse, generating a first range marker pulse signal, a second range marker pulse signal and a trigger pulse signal.

2. The radar data decoder of claim 1 wherein said frame sync detecting means comprises:

a first shift register having a data input for receiving said serial digital data stream, a clock input for receiving said digital clock signal and eight data outputs;

a first AND gate having eight inverting inputs and an output, each of the eight inverting inputs of said first AND gate being connected to one of the eight data outputs of said first shift register;

a second shift register having a data connected to a most significant data bit output of the eight data outputs of said first shift register, a clock input for receiving said digital clock signal and first, second, third, fourth, fifth, sixth, seventh and eighth data outputs;

a second AND gate having first, second, third, fourth, fifth, sixth, seventh and eighth inputs and an output;

the first, second, third and fourth inputs of said second AND gate being respectively connected to the first, second, third and fourth data outputs of said second shift register;

a first inverter having an input connected to the fifth data output of second shift register and an output connected to the fifth input of said second AND gate;

a second inverter having an input connected to the sixth data output of second shift register and an output connected to the sixth input of said second AND gate;

a third inverter having an input connected to the seventh data output of second shift register and an output connected to the seventh input of said second AND gate;

a fourth inverter having an input connected to the eighth data output of second shift register and an output connected to the eighth input of said second AND gate;

a third shift register having a data connected to a most significant data bit output of the eight data outputs of said second shift register, a clock input for receiving said digital clock signal and eight data outputs;

a third AND gate having eight inputs and an output, each of the eight inverting inputs of said third AND gate being connected to one of the eight data outputs of said third shift register;

a fourth shift register having a data connected to a most significant data bit output of the eight data outputs of said third shift register, a clock input for receiving said digital clock signal and eight data outputs;

a fourth AND gate having eight inputs and an output, each of the eight inverting inputs of said fourth AND gate being connected to one of the eight data outputs of said fourth shift register;

a fifth AND gate having a first input connected to the output of said first AND gate, a second input connected to the output of said second AND gate, a third input connected to the output of said third AND gate, a fourth input connected to the output of said fourth AND gate and an output; and a Flip-Flop having a data input connected to the output of said fifth AND gate, a clock input for receiving said clock signal and an output for providing said frame sync pulse.

3. The radar data decoder of claim 1 wherein said latching means comprises a pair of eight-bit D-type latches.

4. The radar data decoder of claim 1 wherein said counting means comprises a synchronous 4-bit binary counter.

5. The radar data decoder of claim 1 wherein said first multiplexing means comprises:

a first AND gate having a first input connected to said control signal generating means, a second input connected to said frame sync detecting means and an output;

an inverter having an input connected to said counting means and an output;

a second AND gate having a first inverting input connected to the output of said inverter, a second inverting input connected to said control signal generating means and an output; and an OR gate having a first input connected to the output of said first AND gate, a second input connected to the output of said second AND gate and an output connected to said modulation means.

6. The radar data decoder of claim 1 wherein said second multiplexing means comprises an analog multiplexer.

7. The radar data decoder of claim 1 wherein said converting means comprises a digital to synchro converter.

8. The radar data decoder of claim 1 wherein said control signal generating means comprises:

a binary counter having a clock input for receiving said digital clock signal, a clear input for receiving said frame sync pulse, an enable input and seven address outputs;

a state machine having seven address inputs, each of said seven address inputs of said state machine being connected to one of said address output of said binary counter, and first, second, third and fourth control signal outputs;

a first Flip-Flop having a data input connected to the first control signal output of said state machine, a clear input for receiving said frame sync pulse, a clock input for receiving said digital clock signal and an output connected to said converting means;

a second Flip-Flop having a data input connected to the second control signal output of said state machine, a clear input for receiving said frame sync pulse, a clock input for receiving said digital clock signal and an output connected to said converting means;

a third Flip-Flop having a data input connected to the third control signal output of said state machine, a clear input for receiving said frame sync pulse, a clock input for receiving said digital clock signal, a non-inverting output connected to the enable input of said counting means and an inverting output connected to said second multiplexing means;

a fourth Flip-Flop having a data input connected to the fourth control signal output of said state machine, a clear input for receiving said frame sync pulse, a clock input for receiving said digital clock signal and an output connected to said first multiplexing means.

9. A radar data decoder for decoding a serial differential data stream received from an encryption unit, said encryption unit generating a differential clock signal, said radar data decoder comprising:

a differential line receiver connected to said encryption unit for receiving said serial differential data stream and said differential clock signal from said encryption unit, said different line receiver converting said serial differential data stream to a serial digital data stream and said differential into a first digital clock signal;

a frame sync detector circuit connected to said differential line receiver for receiving said serial digital data stream, said frame sync detector circuit generating a frame sync pulse whenever said frame sync detector circuit detects a frame sync word encoded in said serial digital data stream;

said frame sync detector circuit decoding said serial digital data stream to provide digital synchro data encoded in said digital data stream whenever said frame sync detector circuit detects a frame sync word encoded in said serial digital data stream;

a latch circuit connected to said frame sync detector for receiving said digital synchro data encoded in said digital data steam, said latch circuit, responsive to said frame sync pulse, latching therein said digital synchro data;

a binary counter connected to said differential line receiver for receiving said first digital clock signal, said binary counter, responsive to said first digital clock signal, generating a random binary number pattern;

a digital multiplexer connected to said binary counter for receiving said random binary number pattern and said frame sync detector circuit for receiving said serial digital data stream from said frame sync detector circuit;

a control signal generating circuit connected to said frame sync detector circuit for receiving said frame sync pulse and said differential line receiver for receiving said first digital clock signal, said control signal generating circuit, responsive to said frame sync pulse and said first digital clock signal, generating at least four control signals;

said digital multiplexer being connected to said control signal generating circuit to receive a first of said four control signals, said digital multiplexer passing therethrough said random binary number pattern whenever said first of said four control signals is at one logic state and said digital multiplexer passing therethrough digital radar video data encoded within said serial digital data stream whenever said first of said four control signals is at another logic state;

a digital to synchro converter connected to said latch circuit and said control signal generating means for receiving a second of said four control signals and a third of said four control signals from said control signal generating circuit, said second and third of said four control signals effecting a transfer of said digital synchro data from said latch circuit to digital to synchro converter, said digital to synchro converter converting said digital synchro to analog synchro signals;

a delta modulation circuit connected to said digital multiplexer for receiving said random binary number pattern and said digital radar video data from said digital multiplexer, said delta modulation circuit converting said digital radar video data into a reconstructed analog radar video signal;

an analog multiplexer connected to said delta modulation circuit and said control signal generating circuit for receiving a fourth of said four control signals, said analog multiplexer passing therethrough said reconstructed analog radar video signal whenever said fourth of said four control signals is at an active logic state;

a clock signal generator for generating a second digital clock signal;

a marker signal generating circuit connected to said frame sync detector circuit for receiving said frame sync pulse and said clock signal generator for receiving said second digital clock signal, said marker signal generating circuit, responsive to said frame sync pulse and said second digital clock signal, generating a first range marker pulse signal, a second range marker pulse signal and a trigger pulse signal.

10. The radar data decoder of claim 9 wherein said frame sync detecting means comprises:

a first shift register having a data input for receiving said serial digital data stream, a clock input for receiving said first digital clock signal and eight data outputs;

a first AND gate having eight inverting inputs and an output, each of the eight inverting inputs of said first AND gate being connected to one of the eight data outputs of said first shift register;

a second shift register having a data connected to a most significant data bit output of the eight data outputs of said first shift register, a clock input for receiving said first digital clock signal and first, second, third, fourth, fifth, sixth, seventh and eighth data outputs;

a second AND gate having first, second, third, fourth, fifth, sixth, seventh and eighth inputs and an output;

the first, second, third and fourth inputs of said second AND gate being respectively connected to the first, second, third and fourth data outputs of said second shift register;

a first inverter having an input connected to the fifth data output of second shift register and an output connected to the fifth input of said second AND gate;

a second inverter having an input connected to the sixth data output of second shift register and an output connected to the sixth input of said second AND gate;

a third inverter having an input connected to the seventh data output of second shift register and an output connected to the seventh input of said second AND gate;

a fourth inverter having an input connected to the eighth data output of second shift register and an output connected to the eighth input of said second AND gate;

a third shift register having a data connected to a most significant data bit output of the eight data outputs of said second shift register, a clock input for receiving said first digital clock signal and eight data outputs;

a third AND gate having eight inputs and an output, each of the eight inverting inputs of said third AND gate being connected to one of the eight data outputs of said third shift register;

a fourth shift register having a data connected to a most significant data bit output of the eight data outputs of said third shift register, a clock input for receiving said first digital clock signal and eight data outputs;

a fourth AND gate having eight inputs and an output, each of the eight inverting inputs of said fourth AND gate being connected to one of the eight data outputs of said fourth shift register;

a fifth AND gate having a first input connected to the output of said first AND gate, a second input connected to the output of said second AND gate, a third input connected to the output of said third AND gate, a fourth input connected to the output of said fourth AND gate and an output; and a Flip-Flop having a data input connected to the output of said fifth AND gate, a clock input for receiving said clock signal and an output for providing said frame sync pulse.

11. The radar data decoder of claim 9 wherein said latch circuit comprises a pair of eight-bit D-type latches.

12. The radar data decoder of claim 9 wherein said binary counter comprises a synchronous 4-bit binary counter.

13. The radar data decoder of claim 9 wherein said digital multiplexer comprises:

a first AND gate having a first input connected to said control signal generating circuit, a second input connected to said frame sync detector circuit and an output;

an inverter having an input connected to said binary counter and an output;

a second AND gate having a first inverting input connected to the output of said inverter, a second inverting input connected to said control signal generating circuit and an output; and an OR gate having a first input connected to the output of said first AND gate, a second input connected to the output of said second AND gate and an output connected to said delta modulation circuit.

14. The radar data decoder of claim 1 wherein said control signal generating circuit comprises:

a binary counter having a clock input for receiving said first digital clock signal, a clear input for receiving said frame sync pulse, an enable input and seven address outputs;

a state machine having seven address inputs, each of said seven address inputs of said state machine being connected to one of said address output of said binary counter, and first, second, third and fourth control signal outputs;

a first Flip-Flop having a data input connected to the first control signal output of said state machine, a clear input for receiving said frame sync pulse, a clock input for receiving said first digital clock signal and an output connected to said digital to synchro converter;

a second Flip-Flop having a data input connected to the second control signal output of said state machine, a clear input for receiving said frame sync pulse, a clock input for receiving said first digital clock signal and an output connected to said digital to synchro converter;

a third Flip-Flop having a data input connected to the third control signal output of said state machine, a clear input for receiving said frame sync pulse, a clock input for receiving said first digital clock signal, a non-inverting output connected to the enable input of said binary counter and an inverting output connected to said analog multiplexer;

a fourth Flip-Flop having a data input connected to the fourth control signal output of said state machine, a clear input for receiving said frame sync pulse, a clock input for receiving said first digital clock signal and an output connected to said digital multiplexer.

15. A radar data decoder for decoding a serial differential data stream received from an encryption unit, said encryption unit generating a differential clock signal, said radar data decoder comprising:

a differential line receiver connected to said encryption unit for receiving said serial differential data stream and said differential clock signal from said encryption unit, said different line receiver converting said serial differential data stream to a serial digital data stream and said differential into a first digital clock signal;

a frame sync detector circuit connected to said differential line receiver for receiving said serial digital data stream, said frame sync detector circuit generating a frame sync pulse whenever said frame sync detector circuit detects a frame sync word encoded in said serial digital data stream;

said frame sync detector circuit decoding said serial digital data stream to provide digital synchro data encoded in said digital data stream whenever said frame sync detector circuit detects a frame sync word encoded in said serial digital data stream;

a latch circuit connected to said frame sync detector for receiving said digital synchro data encoded in said digital data steam, said latch circuit, responsive to said frame sync pulse, latching therein said digital synchro data;

a binary counter connected to said differential line receiver for receiving said first digital clock signal, said binary counter, responsive to said first digital clock signal, generating a random binary number pattern;

a digital multiplexer connected to said binary counter for receiving said random binary number pattern and said frame sync detector circuit for receiving said serial digital data stream from said frame sync detector circuit;

a control signal generating circuit connected to said frame sync detector circuit for receiving said frame sync pulse and said differential line receiver for receiving said first digital clock signal, said control signal generating circuit, responsive to said frame sync pulse and said first digital clock signal, generating at least four control signals;

said digital multiplexer being connected to said control signal generating circuit to receive a first of said four control signals, said digital multiplexer passing therethrough said random binary number pattern whenever said first of said four control signals is at one logic state and said digital multiplexer passing therethrough digital radar video data encoded within said serial digital data stream whenever said first of said four control signals is at another logic state;

a digital to synchro converter connected to said latch circuit and said control signal generating means for receiving a second of said four control signals and a third of said four control signals from said control signal generating circuit, said second and third of said four control signals effecting a transfer of said digital synchro data from said latch circuit to digital to synchro converter, said digital to synchro converter converting said digital synchro to analog synchro signals;

a delta modulation circuit connected to said digital multiplexer for receiving said random binary number pattern and said digital radar video data from said digital multiplexer, said delta modulation circuit converting said digital radar video data into a reconstructed analog radar video signal;

an analog multiplexer connected to said delta modulation circuit and said control signal generating circuit for receiving a fourth of said four control signals, said analog multiplexer passing therethrough said reconstructed analog radar video signal whenever said fourth of said four control signals is at an active logic state;

a clock signal generator for generating a second digital clock signal;

a marker signal generating circuit connected to said frame sync detector circuit for receiving said frame sync pulse and said clock signal generator for receiving said second digital clock signal, said marker signal generating circuit, responsive to said frame sync pulse and said second digital clock signal, generating a first range marker pulse signal, a second range marker pulse signal and a trigger pulse signal; and a one shot multivibrator having an input connected to said frame sync detector circuit for receiving said frame sync pulse, said one shot multivibrator, responsive to said frame sync pulse, generating a logic one pulse signal having a pulse repetition frequency greater than a radar which provides the digital radar video data encoded within said serial digital data stream.

16. The radar data decoder of claim 15 wherein said frame sync detecting means comprises:

a first shift register having a data input for receiving said serial digital data stream, a clock input for receiving said first digital clock signal and eight data outputs;

a first AND gate having eight inverting inputs and an output, each of the eight inverting inputs of said first AND gate being connected to one of the eight data outputs of said first shift register;

a second shift register having a data connected to a most significant data bit output of the eight data outputs of said first shift register, a clock input for receiving said first digital clock signal and first, second, third, fourth, fifth, sixth, seventh and eighth data outputs;

a second AND gate having first, second, third, fourth, fifth, sixth, seventh and eighth inputs and an output;

the first, second, third and fourth inputs of said second AND gate being respectively connected to the first, second, third and fourth data outputs of said second shift register;

a first inverter having an input connected to the fifth data output of second shift register and an output connected to the fifth input of said second AND gate;

a second inverter having an input connected to the sixth data output of second shift register and an output connected to the sixth input of said second AND gate;

a third inverter having an input connected to the seventh data output of second shift register and an output connected to the seventh input of said second AND gate;

a fourth inverter having an input connected to the eighth data output of second shift register and an output connected to the eighth input of said second AND gate;

a third shift register having a data connected to a most significant data bit output of the eight data outputs of said second shift register, a clock input for receiving said first digital clock signal and eight data outputs;

a third AND gate having eight inputs and an output, each of the eight inverting inputs of said third AND gate being connected to one of the eight data outputs of said third shift register;

a fourth shift register having a data connected to a most significant data bit output of the eight data outputs of said third shift register, a clock input for receiving said first digital clock signal and eight data outputs;

a fourth AND gate having eight inputs and an output, each of the eight inverting inputs of said fourth AND gate being connected to one of the eight data outputs of said fourth shift register;

a fifth AND gate having a first input connected to the output of said first AND gate, a second input connected to the output of said second AND gate, a third input connected to the output of said third AND gate, a fourth input connected to the output of said fourth AND gate and an output; and a Flip-Flop having a data input connected to the output of said fifth AND gate, a clock input for receiving said clock signal and an output for providing said frame sync pulse.

17. The radar data decoder of claim 15 wherein said latch circuit comprises a pair of eight-bit D-type latches.

18. The radar data decoder of claim 15 wherein said binary counter comprises a synchronous 4-bit binary counter.

19. The radar data decoder of claim 15 wherein said digital multiplexer comprises:

a first AND gate having a first input connected to said control signal generating circuit, a second input connected to said frame sync detector circuit and an output;

an inverter having an input connected to said binary counter and an output;

a second AND gate having a first inverting input connected to the output of said inverter, a second inverting input connected to said control signal generating circuit and an output; and an OR gate having a first input connected to the output of said first AND gate, a second input connected to the output of said second AND gate and an output connected to said delta modulation circuit.

20. The radar data decoder of claim 15 wherein said control signal generating circuit comprises:

a binary counter having a clock input for receiving said first digital clock signal, a clear input for receiving said frame sync pulse, an enable input and seven address outputs;

a state machine having seven address inputs, each of said seven address inputs of said state machine being connected to one of said address output of said binary counter, and first, second, third and fourth control signal outputs;

a first Flip-Flop having a data input connected to the first control signal output of said state machine, a clear input for receiving said frame sync pulse, a clock input for receiving said first digital clock signal and an output connected to said digital to synchro converter;

a second Flip-Flop having a data input connected to the second control signal output of said state machine, a clear input for receiving said frame sync pulse, a clock input for receiving said first digital clock signal and an output connected to said digital to synchro converter;

a third Flip-Flop having a data input connected to the third a third Flip-Flop having a data input connected to the third control signal output of said state machine, a clear input for receiving said frame sync pulse, a clock input for receiving said first digital clock signal, a non-inverting output connected to the enable input of said binary counter and an inverting output connected to said analog multiplexer;

a fourth Flip-Flop having a data input connected to the fourth control signal output of said state machine, a clear input for receiving said frame sync pulse, a clock input for receiving said first digital clock signal and an output connected to said digital multiplexer.

* * * * *